W. L. ROSS & A. LEIFFER.
TIRE.
APPLICATION FILED MAY 23, 1911.
1,083,143.
Patented Dec. 30, 1913.
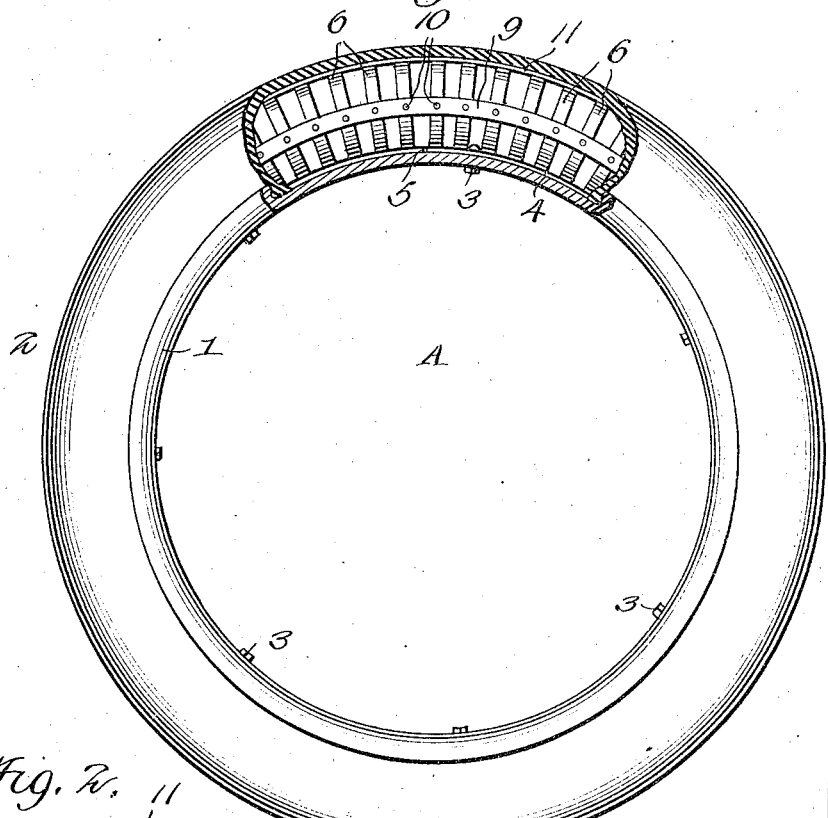
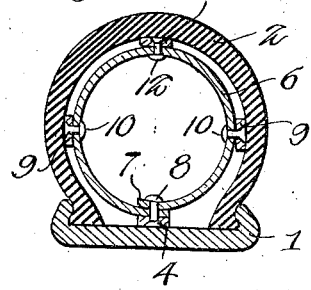
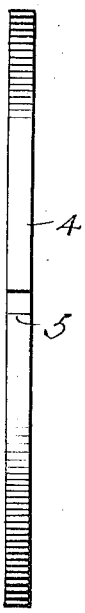
Witnesses
Inventors
William L. Ross
Almon Leiffer
By Victor J. Evans
Attorney

UNITED STATES PATENT OFFICE.

WILLIAM L. ROSS AND ALMON LEIFFER, OF BELLAIRE, OHIO.

TIRE.

1,083,143.  Specification of Letters Patent.  Patented Dec. 30, 1913.

Application filed May 23, 1911. Serial No. 629,001.

*To all whom it may concern:*

Be it known that we, WILLIAM L. Ross and ALMON LEIFFER, citizens of the United States, residing at Bellaire, in the county of Belmont and State of Ohio, have invented new and useful Improvements in Tires, of which the following is a specification.

This invention relates to certain novel and useful improvements in tires adapted to be employed in connection with automobiles, motor cycles and vehicles of various types.

In the present instance, it is our purpose to provide a vehicle tire of the spring-cushion type, the parts being so correlated and arranged that a simple, durable and efficient structure is attained which is adapted to be placed inside of the ordinary outer casing or tire, thus taking the place of an inner tube or tire.

A further object of our invention is to provide a tire formed of a plurality of springs or resilient bands, connected to a series of circumferentially arranged bands which extend over the top and at the sides of the springs said springs being attached at their ends to a split ring of resilient metal which in turn is bolted or otherwise suitably secured to the rim of the wheel.

With the above-recited objects and others of a similar nature in view, the invention consists in the construction, combination and arrangement of parts, set forth in and falling within the scope of the appended claim.

In the accompanying drawing: Figure 1 is a side view of a vehicle wheel provided with our invention, a portion thereof being broken away. Fig. 2 is a cross sectional view, taken through a structure such as is shown in Fig. 1. Fig. 3 is an end view of the split ring adapted to be connected to the wheel rim.

Referring to the drawing in detail, the numeral A indicates a portion of an ordinary vehicle wheel, of which 1 is the rim and 2 is the outer casing or tire of the usual construction. Adapted to extend circumferentially of the rim and to be secured thereto through the medium of a suitable number of bolts or other fastening means 3 is a metallic band or ring 4 split as at 5 so that said band may be easily sprung in position on the rim. Connected to this ring 4 is a suitable number of spring bands 6, each bent into the form of an approximately circular loop and connected at their ends 7 to the band 4 by the medium of bolts 8. These spring bands which are constructed of any suitable metal, are arranged entirely around the circumference of the rim and radially relative to the hub of the wheel. If desired, the bands may be constructed of heavy spring wire, but we prefer to form the same of flat strips or bands of metal, the ends of each band, when fastened to the rim ring being spaced apart a suitable distance, for instance one inch in order that the proper spring resilient effect may be attained. In order to preserve the loops or bands in their proper position relative to the rim of the wheel and to each other, we provide the endless side rings 9—9, which are also of metal, and to which the individual loops or spring bands are bolted or otherwise fastened as at 10, while 11 indicates an endless metallic band, similar to the rings 9, the ring or band 11 extending circumferentially over the tops of the loops or individual bands which form the spring for the tire. The individual loops or bands are secured to this peripheral ring 11 by means of screws or bolts 12. By the construction just described, the small spring loops or bands are riveted or otherwise secured to the split ring of the rim and to the side and peripheral rings which connect all of the bands together and thereby maintain the same in proper position and prevent the distortion of the spring thus formed. The cushion tire when constructed as described of the rings and loops or bands is designed to be placed within and covered by the ordinary outer casing of the wheel.

It will be seen that we have provided a simple, durable and effective form of spring cushioned tire which will partake of many of the advantages of the ordinary pneumatic tire, and yet will obviate the principal disadvantage incident to the pneumatic tire, that is to say, the collapsing of the same due to bursting, punctures, cuts and other injuries. Furthermore, we have provided a type of spring cushioned tire which may be applied to any type of vehicle and which may be manufactured and marketed at a relatively low cost.

We claim:—

The combination with a wheel rim, of a series of individual spring members split transversely and forming loops or bands and having their split ends overlapping each other, a split ring secured on the wheel rim, bolts connecting the overlapping ends of each loop or band to the split ring, endless side rings connecting the bands at the sides thereof, an endless top ring connecting the bands and forming the periphery thereof, and an outer casing or covering for the tire, said side and top rings holding the outer casing spaced from the spring members.

In testimony whereof we affix our signatures in presence of two witnesses.

WILLIAM L. ROSS.
ALMON LEIFFER.

Witnesses:
JOHN HEDDELSON,
HARRY B. KINNEY.